Nov. 17, 1970   M. J. BINKS   3,541,340
RADIATION SENSITIVE MACHINE FOR ZONAL SCAN FLAW DETECTION
Filed Aug. 30, 1968   2 Sheets-Sheet 1

INVENTOR.
MELVIN J. BINKS
BY
Davis, Lucas, Brewer & Brugman
ATTORNEYS

Nov. 17, 1970   M. J. BINKS   3,541,340
RADIATION SENSITIVE MACHINE FOR ZONAL SCAN FLAW DETECTION
Filed Aug. 30, 1968   2 Sheets-Sheet 2
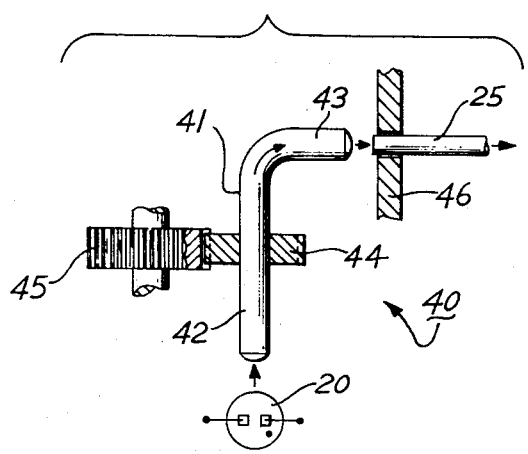
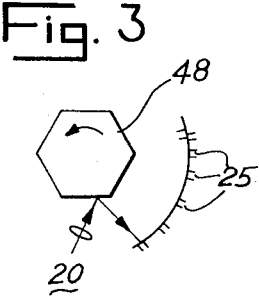
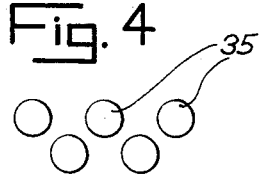
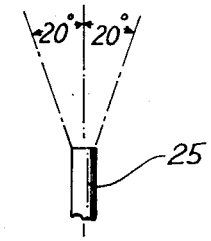
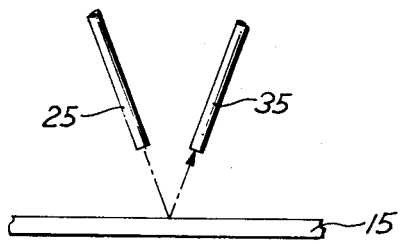
INVENTOR.
MELVIN J. BINKS
BY
Davis, Lucas, Brewer & Brugman
ATTORNEYS

United States Patent Office 3,541,340
Patented Nov. 17, 1970

3,541,340
RADIATION SENSITIVE MACHINE FOR ZONAL SCAN FLAW DETECTION
Melvin J. Binks, Barrington, Ill. (% Binks Industries, Inc., 391 E. Potter Ave., Wood Dale, Ill. 60191)
Filed Aug. 30, 1968, Ser. No. 756,689
Int. Cl. G01n 21/32
U.S. Cl. 250—219          3 Claims

ABSTRACT OF THE DISCLOSURE

Flaw detection by application of a light source and sensor in a scan of repeated sweeps at limited zones successively across sheet material. Scan is through light pipes in a row across the material and in communication with a rotary light source and/or rotary light pick-up synchronized therewith. Signals are distributed corresponding to the zones by a rotary light beam, synchronized with the light pick-up and energized by signals therefrom to impinge on individual light sensors in the path of the beam, for flaw detection of a plurality of axial areas of the material.

BACKGROUND OF THE INVENTION

This invention relates generally to flaw detectors in sheet materials, and more particularly, to a method and machine for zonal scan flaw detection.

In the past, flaw detection in opaque sheet material has commonly accomplished by passing the sheet between a light source and light sensor. Flaw location was limited to a single coordinate, that is, longitudinally along the sheet material. There was no transverse coordinate location. Thus, even when most of the flaws occurred near the sheet edges, say due to basic steel mill ingot process, the exact transverse flaw location remained unknown. This prevented maximum salvage by shearing off the edges to the inwardmost flaw. Also the prior art did not provide for individual detection in each of a plurality of axial areas of the sheet material, which is desirable when the sheet is to be divided into strips, e.g. ferrite coated recording tape.

In the past, the detection of translucent material, such as paper, recording tape, etc. has not been practical. This is due to the requirement that the flaw signal must be larger in amplitude than the "noise." For example, in opaque detection, typical noise level is at about four millivolts, and the photo tube-filter-amplifier may develop 100 millivolts from a one mil hole, yielding a signal-noise ratio of 25:1. On the other hand in translucent detection, the light source and aperture being equal in length to the strip width, the light is usually excessive compared to a small flaw signal, and thus the noise may exceed the signal. (Prior tests conducted with ferrite coated recording film of a 26 inch width, resulted in over 200 millivolts noise, which swamped all signals for flaws smaller than 5 mils.)

SUMMARY OF THE INVENTION

Therefore, to overcome the foregoing and other difficulties of the prior art, it is the general object of this invention to provide a new and improved method and machinery capable of high speed flaw detection by employing a zonal scan. To this end, the present invention teaches the application of a light source and sensor in a sweep at limited zones successively across the sheet material.

Application of the light source and sensor in a zonal scan is accomplished by a plurality of individual light sources and/or a plurality of individual light sensor means aligned in rows proximate the sheet material. The individual light sources and/or light sensor means are successively energized and/or connected for reception, respectively, by a fluctuation means, which repeats the scan sweep at a period related to the travel of the material. Flaws are detected at each individual zone by exposure thereat of the sensor means to the light source. Since the detection at any one instance is a limited zone, extraneous light detection at the sensor is diminished to provide an improved signal-noise ratio and increased sensitivity. The signals for the zones may be segregated by a distributor means which feeds the signals to individual channels corresponding to the zones for recording to yield an individual flaw detection for each of a plurality of axial areas of the material.

Thus, one of the objects of this invention is to increase the sensitivity and signal to noise ratio in flaw detectors.

It is an object of this invention to diminish extraneous light detection at the light sensor of a flaw detector.

Another object of this invention is to provide a method and machine for flaw detection by a zonal scan of the light source and sensor at limited successive zones.

It is still another object to provide zonal scan flaw detection by a plurality of individual light sources and/or light sensors.

It is an object to provide flaw detection for translucent materials.

Yet another object is to provide individual flaw detection for a plurality of axial areas in a sheet material.

It is an object of this invention to provide individual flaw detection in a plurality of axial areas in sheet material by zonal scan and individual distribution thereof.

Also an object is to provide a dependable high speed zonal scan flaw detection method and machine by utilization of modern electronic and optical components.

Further and other objects, and a more complete understanding of the invention may be had by referring to the following description and claims, taken in conjunction with the accompanying drawings.

DESCRIPTION OF THE DRAWINGS

For the purpose of illustrating the invention, there is shown in the drawings a form which is an illustrative mechanical embodiment, however, it is understood that this invention is not necessarily limited to the precise arrangements in instrumentalities there shown.

FIG. 2 is a side view, partially in section of the light distributor shown in FIG. 1;

FIG. 3 is a schematic representation of an alternate mechanical light distributor for the invention;

FIG. 4 shows the plan view of a typical arrangement of light pipes;

FIG. 5 illustrates the typical light distribution of an individual light pipe; and FIG. 6 illustrates a variation utilizing a reflective method of detection.

DESCRIPTION OF THE PREFERRED EMBODIMENT

Figure 1:
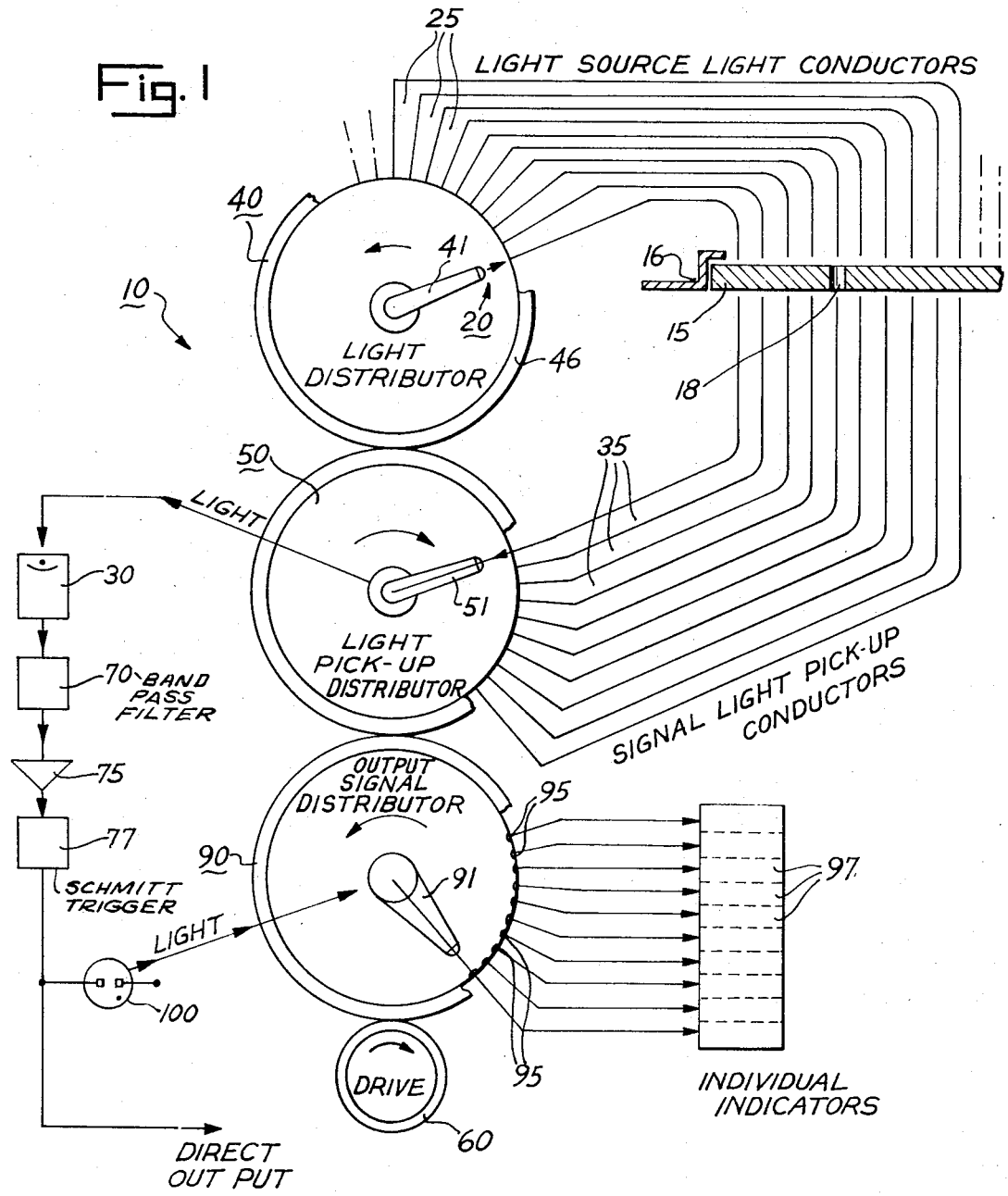
FIG. 1 is schematic illustration of a mechanical embodiment of the present invention.

Referring now to the drawings in detail, wherein like numerals indicate like elements, there is shown in FIG. 1 an illustration of a machine indicated generally at 10 for zonal flaw detection in accordance with the method of the present invention. A sheet material 15, either translucent or opaque (shown in cross section), passes between a light source 20, and a light sensor shown at 30. Typical edge shields 16, which may be of the automatic tracking type such as that disclosed in U. S. Patent No. 3,341,709 issued Sept. 12, 1967, to Melvin J. Binks, are provided for the purpose of limiting extraneous light at the edges of sheet 15. Detection of a flaw 18, which may be on the order of one mil (.001), is by exposure through the defect of the light sensor 30 to the light source 20. However, the method of the invention departs from the usual in that the light source 20 and/or light sensor 30 are applied by scanning at limited zones successively across material 15 (from left to right in the figure).

The scanning means may be considered as having two major components, namely, (1) a plurality of light sources and/or light sensor means and (2) fluctuation means.

A plurality of light sources may be provided by light pipes 25 in a row proximate and across sheet 15 and in communication with the light source 20. It is understood of course, that the light pipes 25 have optical light directing properties, for example, such as provided by aligned glass fiber bundles according to the disclosure of Patent No. 3,188,478 issued June 8, 1965 to Melvin J. Binks.

In a like manner, a plurality of light sensor means may be provided by light pipes 35 in a row proximate and across sheet 15 and in communication with the light sensor 30.

It is to be noted, that though the preferred embodiment shown in FIG. 1, includes a plurality of both light sources and light sensor means by means of pipes 25 and 35, that it is not necessary to have both for the purposes of this invention. That is, a conventional single light source could be used in conjunction with the plurality of light pipes 35 shown, or in the alternative, a single conventional light sensor could be used in conjunction with the plurality of light sources shown. However, the use of a plurality of both light sources and sensor means is preferable, yielding a higher signal-noise ratio for the reasons disclosed hereafter.

It is also to be understood, that the mechanical embodiment shown, is only one of many possible variations, for example, the plurality of light sources could just as well be provided by individual fast lamps such as the G.E. SSL4, Laser, etc. in place of the light pipes 25. Similarly, the plurality of individual light sensor means could be provided by individual light sensors such as the LSTR, LSSCR, in place of the light pipes 35. Furthemore, although shown as individual light pipes 25 and 35, for each of the zones, the zones could be provided by groups of pipes as desired. With reference to FIG. 4, a plan view is shown of a typical light pipe arrangement providing sufficient overlap for complete coverage. The typical focus of a light pipe 25, shown in FIG. 5, is of limited light divergence, and yet insures complete coverage when arranged in the manner suggested. (The limited light divergence at each zone during an instant of scan diminishes extraneous light to provide increased sensitivity.) If desired, an aperture (not shown) in the support surface (not shown) between the light pipes 25 and 35 may be similarly limited. That is, the aperture may be provided by a plurality of apertures matching the diameter of the light pipes and arranged in similar fashion.

It may be visualized with reference to FIG. 6, that the scope of this invention is not necessarily limited to detection of sheet material 15 passing between light source 20 and light sensor 30. The concepts of this invention are equally applicable to detection by reflection, with both light source 20 and light sensor 30 on the same side of the sheet material 15 in the manner indicated.

Fluctuation means are provided to apply light at each individual light pipe 25 in a sweep successively across sheet material 15. This has been mechanically provided by the light distributor shown and indicated generally at 40 in FIGS. 1 and 2. As shown in FIG. 2, a right angle light pipe 41, having legs 42, 43, is keyed to a gear 44 which is engaged with a drive gear 45 for rotation thereby. Leg 42 of the light pipe 41 is in communication with the light source 20 as schematically shown, for projection of light out of the leg 43, which acts as a rotating radius. The light pipes 25 are arranged in the rotation path of the light projection of leg 43, through an upright wall 46 of the light distributor, as shown. It is clear that rotation of the right angle pipe 41 in light distributor 40 will apply light source 20 to each individual light pipe 25 successively in repeated sweeps across the sheet material 15.

Fluctuation means are similarly provided for the light pipes 35 by the light pick-up distributor 50. The construction of light pick-up distributor 50 is identical to that of light distributor 40, so that the detail thereof is not repeated. In this case, the light direction is reversed, the right angle light pipe 51 receives light from the light pipes 35 and transmits them to the light source 30, as indicated by the arrows of FIG. 1. It is understood, of course, that the light distributor 40 and light pick-up distributor 50 have their drive gears synchronized by appropriate drive gears (not shown) and driven by a motor drive 60 so that each is at a corresponding pair of the light pipes 25 and 35, respectively.

The light distributor and light pick-up distributor 40 and 50, may of course, be provided by many other means, such as that shown in FIG. 3. There a polyhedral mirror 48 is rotated in front of the light source 20 (indicated by the arrow) to sweep a beam in a circular path, as indicated. It is of course understood, that the same method may be utilized to pass the light beams in reverse, that is from the light pipes 35 to a light sensor 30.

The mechanical version shown in the drawings and disclosed above have, of course, speed limitations. The mechanical version is depicted in an effort to clarify the inventive concepts, even to the extent of showing a motor drive 60. Mechanical drive, such as that schematically shown, would be suitable for limited widths of strip material 15 traveling as fast as 600 feet per minute. However, of course, it would be preferable to scan much faster to insure detection of even most minute flaws and to provide a high speed operation for sheet material traveling at 2,500 feet per minute or faster. This may be accomplished by scanning in multiples or by the use of electronic scanning, for example, a use of a typical T.V. tube raster (light source) and T.V. camera (pick-up) (neither shown). Well known electronic means for synchronization are envisioned between the raster and the camera. Another example would be to use individual light sources and light sensors, such as individual fast lights and LSTRs, which are connected to high speed electronic fluctuation means.

The output from the light sensor 30 may, as it is commonly done in the art, be fed through a band pass filter 70 to an amplifier 75 and through a discriminating trigger such as a Schmitt trigger 77. The output of the trigger 77 may be directly connected to marking or other indicating apparatus, as is usual in the art. However, it may be desirable to provide transverse flaw location coordinates so that the sheet material 15 may have individual flaw detection for plurality of axial areas therein. In such case, the signals from sensor 30 must be segregated by a distributor means.

A mechanical distributor means is illustrated in FIG. 1. There the output signal distributor 90 has a rotating right angle light pipe 91 of identical construction to that disclosed for the light distributor 40. However, in this case, light is transmitted from a light source 100 which is energized by signals of light received at the light pipes 35. The right angle light pipe 91 is synchronized for rotation with the right angle light pipe 51 of the light pick-up distributor 50. Individual light sensors, such as light sensitive transistors 95, are placed in the path of the rotating light beam provided by light source 100 and rotating right angle light pipe 91. Impulses from the individual light sensors 95 are fed, as indicated by the arrows, to individual indicator means 97, which may be electronic recorders and/or individual conventional markers, or the like.

In operation, sheet material 15 travels by the light pipes 25, 35 at a uniform rate. An electric motor drive 60 causes a rotation through a conventional gear train (not shown), typified by gears 44, 45 to synchronously drive the distributors 40, 50 and 90. The speed of the drive 60 is chosen to provide a scan period related to the travel rate of the sheet material 15. For example, for a sheet travel of 600 f.p.m., to accomplish a scan in a maximum of one quarter inch strip travel, would require a sweep time of .00208 seconds. The sweep rate must be 480.7 per minute, which is within the capabilities of the mechanical drive shown. Light will be distributed from light source 20 through the right angle rotary light pipe 41 to each individual light pipe 25 successively. Each individual light pipe 25 is focused on the sheet material 15 to provide an individual zone. Each rotation of the right angle light pipe 41 will provide a scan sweep. The light pick-up distributor 50 is synchronized with the light distributor 40, so that the right angle light pipe 51 is at an individual of the light pipes 35 corresponding to an individual light pipe 25, which is lit, at any one instant. In this manner, the light source and sensor applied in a scan at limited zones across the sheet material. Of course, it is understood, that either one or the other could be eliminated, for the conventional light source and/or sensor and still provide a scan. When a defect 18 appears between the light pipes 25, 35 only the light from appropriate light pipes 25 will pass therethrough. Likewise, only appropriate light pipes 35 will receive that light for transmission through the light pick-up distributor 50 to the light sensor 30. Thus, even in the event that sheet 15 be translucent, the light in any one instant, will not be excessive as compared to the signal. In this manner increased signal-noise ratio and sensitivity are provided. Signal from light sensor 30 is filtered through band filter 70, amplified through standard amplifier 75, and fed through a discriminating trigger 77. A direct impulse from the trigger 77 may be utilized, in a conventional manner, for flaw indications.

On the other hand, if a transverse location coordinate of the flaw is desired, and/or if individual flaw detection for each of the plurality of axial areas of the material 15 is desired, the signal from the trigger 77 is fed to energize a light source 100. The distributor 90 segregates impulses from source 100 to various individual channels provided by the individual light sensors 95 by means of synchronous rotation of the right angle light pipe 91. Signals from the individual light sensors 95 may be utilized for registration on individual indicators 97. In this manner, a transverse location coordinate as well as individual flaw detection for a plurality of axial areas may be achieved.

The present invention may be embodied in other specific forms without departing from the spirit of potential attributes thereof and, accordingly, reference should be made to the appended claims, rather than to the foregoing specification, as indicating the scope of the invention.

I claim:

1. In a pin hole detector for detecting and locating flaws in rapidly moving sheet materials having two major surfaces, the combination comprising: a first light source, sensor means operatively responsive to light to generate output signals, means for transmitting light over a plurality of discrete light shielded paths from said source to said sensor means comprising a plurality of individual light transmitting pipes each having one end thereof adjacent said light source and the other end thereof opposite a said discrete area on one face of the sheet material, with such other ends being arrayed in a pattern traversing the travel path of the sheet material; a corresponding plurality of light receiving pipes similarly arrayed across the other face of the sheet material with one end of each adjacent said other face and the opposite end thereof adjacent said sensor means, each of said light receiving pipes being opposite a corresponding light transmitting pipe on the opposite side of the sheet material; first light distributing means between said source and the said one ends of said light transmitting pipes, the same shielding said source from said transmitting pipes and operable to distribute light from said source individually to adjacent pipe ends, successively and in a predetermined sequence whereby said light is applied by said transmitting pipes across said one face of the sheet material at each of said discrete areas in succession; said first distributing means operatively repeating the distribution of light to successive light transmitting pipes at a rate effective to sweep all said areas with minimum travel of the sheet material past said light transmitting pipes; second light distributing means between the other end of said light receiving pipes and said sensor and operable to scan adjacent ends thereof in a predetermined sequence, synchronized with said first light distributing means, and to redistribute light received from any one of said light receiving pipes to said sensor means; circuit means responsive to output signals of said sensor means including a second light source periodically illuminated in response to said output signals; third light distributing means adjacent said second light source and operable to distribute light therefrom individually to a plurality of light responsive means corresponding in number to said light transmitting pipes and areas; each said responsive means operating in the presence of light received from said third distributing means to actuate indicator means individually associated therewith and with one of said areas to locate a light producing flaw within said area, and means synchronizing the distribution of light by the three said distributing means whereby to coordinate output of said second light source, said indicator means, distribution of light from said first source, and periodic energization of said sensor means.

2. The combination of claim 1 wherein each of said distributor means comprises a constantly driven rotating light pipe, having one radial arm angularly disposed with respect to the axis or rotation thereof to distribute light along a circumferential path at a rate regulated by said synchronizing means.

3. The combination of claim 1 wherein said circuit means comprises filter means, amplifier means, and discriminator means for periodically energizing said second light source in synchronized response to said output signals.

References Cited

UNITED STATES PATENTS

| | | | |
|---|---|---|---|
| 2,938,666 | 5/1960 | Rand | 250—227 X |
| 3,188,478 | 6/1965 | Binks | 250—219 |
| 3,240,106 | 3/1966 | Hicks | 250—227 X |
| 3,255,357 | 6/1966 | Kapant et al. | 250—227 |
| 3,325,594 | 6/1967 | Goldhammer et al. | 178—7.6 |
| 3,335,367 | 8/1965 | Skooglund et al. | 250—227 X |
| 3,372,240 | 3/1968 | Boyers et al. | 250—227 X |
| 3,445,672 | 5/1969 | Marks | 250—219 |

WALTER STOLWEIN, Primary Examiner

U.S. Cl. X.R.

256—227; 356—237